(12) United States Patent
Bellows et al.

(10) Patent No.: US 12,530,656 B2
(45) Date of Patent: Jan. 20, 2026

(54) INVENTORY SUPPORT FOR ITEMS MONITORED BY AN INVENTORY MANAGEMENT SYSTEM

(71) Applicant: ZEBRA TECHNOLOGIES CORPORATION, Lincolnshire, IL (US)

(72) Inventors: David Bellows, Old Westbury, NY (US); Russell Calvarese, Stony Brook, NY (US); Sean Connolly, Stony Brook, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 112 days.

(21) Appl. No.: 17/544,596

(22) Filed: Dec. 7, 2021

(65) Prior Publication Data

US 2023/0177455 A1 Jun. 8, 2023

(51) Int. Cl.
*G06Q 10/087* (2023.01)
*B65G 1/04* (2006.01)
*H04L 67/12* (2022.01)

(52) U.S. Cl.
CPC ......... *G06Q 10/087* (2013.01); *B65G 1/0457* (2013.01); *H04L 67/12* (2013.01)

(58) Field of Classification Search
CPC ..... G06Q 10/087; B65G 1/0457; H04L 67/12
USPC ......................................................... 705/28
See application file for complete search history.

(56) References Cited

U.S. PATENT DOCUMENTS

| 11,222,305 B1 * | 1/2022 | Clayton .............. G06Q 10/087 |
| 2015/0185068 A1 * | 7/2015 | Anderson .......... G01G 19/4144 |
| | | 702/173 |

\* cited by examiner

*Primary Examiner* — Ariel J Yu
*Assistant Examiner* — Denisse Y Ortiz Roman

(57) ABSTRACT

An inventory system is disclosed. The inventory system may include a support frame and a suspension support that is configured to extend from the support frame. The inventory system may include a sensor configuration arranged on the suspension support. The sensor configuration may include a plurality of sensor elements that are configured to sense whether one or more objects are being suspended from the suspension support. The inventory system may include an electrical connector interface that facilitates communication of an inventory status associated with the suspension support.

18 Claims, 8 Drawing Sheets

INVENTORY SUPPORT FOR ITEMS MONITORED BY AN INVENTORY MANAGEMENT SYSTEM

BACKGROUND

Businesses or organizations may utilize sensor technology to monitor a status or presence of objects (e.g., to detect status changes, theft, and/or removal or addition of retail products on display, inventory, stored resources or equipment, and/or the like). For example, a business may use an array of sensors mounted to a surface of a shelf to monitor objects on the shelf and/or detect whether objects have been removed from or added to the shelf. However, some businesses or organizations may prefer to use support systems other than a shelf-type system, such as a suspension-based support system, that enables the objects or packaging to be hung and/or suspended from supports (e.g., pegs, rods, rails, or the like) of the system. Accordingly, there is a need for an inventory system that includes sensor technology in such a support system.

SUMMARY

In some implementations, an inventory structure for managing inventory may include a support frame and a suspension support that is configured to extend from the support frame. The inventory structure may include a sensor configuration arranged on the suspension support, where the sensor configuration includes a plurality of sensor elements that are configured to sense whether one or more objects are being suspended from the suspension support. The inventory structure may include an electrical connector interface that facilitates communication of an inventory status associated with the suspension support.

In some implementations, a suspension support for supporting inventory may include a sensor configuration arranged on an upper surface of the suspension support. The sensor configuration may include a plurality of sensor elements that are configured to sense whether one or more objects are being suspended from the suspension support. The suspension support may include an electrical connector interface that is configured to facilitate communication of sensor data associated with the plurality of sensor elements to indicate an inventory status associated with the suspension support.

In some implementations, an inventory system may include a suspension support that is configured to extend from a support frame. The inventory system may include a sensor configuration arranged on the suspension support, where the sensor configuration includes a plurality of sensor elements that are configured to sense whether an object is suspended from the suspension support. The inventory system may include a controller configured to receive, from a sensor element of the plurality of sensor elements, a sensor measurement that is associated with one or more objects being suspended from the suspension support. The controller may be configured to determine, based on a measured value of the sensor measurement, a quantity of the one or more objects that are being suspended from the suspension support at a location of the sensor element on the suspension support. The controller may be configured to provide, to an inventory management system, the quantity within an inventory status associated with the one or more objects.

DETAILED DESCRIPTION

Figure 1:
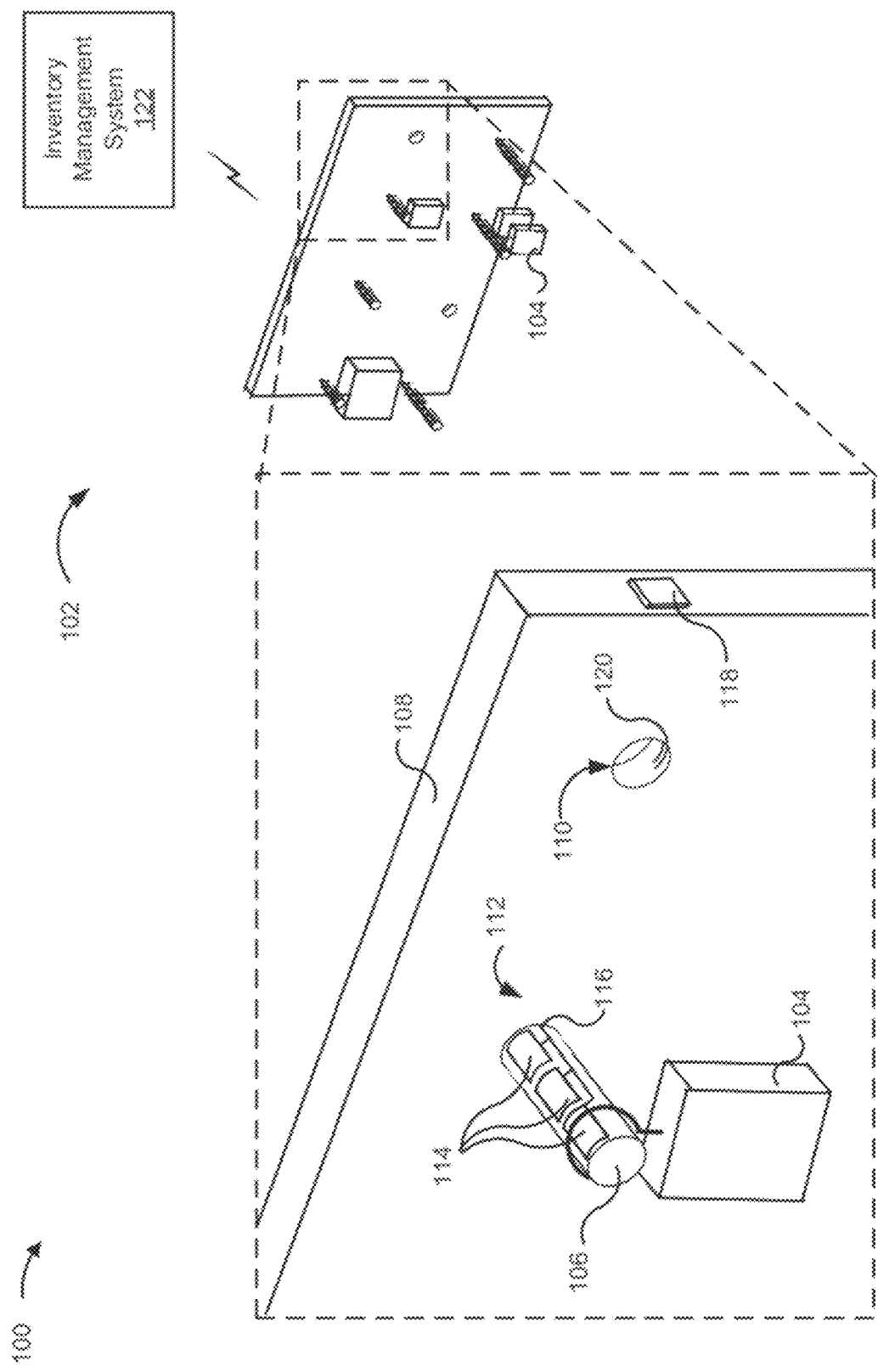
FIG. 1 is a diagram of an example implementation associated with an inventory system described herein.

The following detailed description of example implementations refers to the accompanying drawings. The same reference numbers in different drawings may identify the same or similar elements.

Arrays of sensors can be used on a shelf to enable a system to provide and/or obtain information associated with objects on the shelf. Such sensors in a shelf-based system are typically optical sensors and/or weight sensors (e.g., scales) that are mounted to a surface of the shelf to permit the sensors to detect the presence of an object (or lack thereof) on the shelf (e.g., based on a measured received light intensity or reflection and/or a measured weight). In some instances, the array of sensors can be distributed on the top surface of the shelf in a pattern (e.g., a two-dimensional pattern) that can enable the system to determine how much of the surface is covered by objects on the shelf, count the number of objects on the shelf, identify the location of the objects on the shelf, and/or the like.

However, for a suspension-based support system, due to the physical constraints and/or dimensions of typical suspension supports and/or items (e.g., objects and/or packages of objects that are to be suspended by suspension supports), the suspension supports cannot utilize sensor configurations that are typically used in a shelf-based system. For example, because packaging for an object suspended from a suspension support can be relatively thin and an optical sensor can only detect a presence of an object (or lack thereof) in an immediate vicinity of the optical sensor, a configuration of optical sensors on the suspension support would require a relatively large quantity of optical sensors in order to accurately detect a quantity of the objects suspended from the suspension support. Such a large quantity of optical sensors can be expensive, impractical, prohibitive, or infeasible due to the physical dimensions of the suspension support. For example, an increase in the quantity of optical sensors would significantly affect the supporting hardware and/or circuitry needed to operate the optical sensors, the processing time necessary to cycle through all of the optical sensor readings, the power required to operate the optical sensors, and/or the like. Thus, using an optical sensor configuration on a suspension support would likely result in an undesirable tradeoff between system accuracy and resource consumption (and/or cost).

Furthermore, a weight sensor (e.g., a scale, strain gauge, or moment or torque sensor on a suspension support) may not be able to accurately indicate a quantity of objects suspended from a suspension support that is cantilevered from a support frame (e.g., such as a peg extending from a pegboard or similar cantilevered bracket extending from a bracket support frame). For example, because a measured moment of a same quantity of objects may vary depending on the positioning of the objects along the suspension support (e.g., objects suspended at a free end of the cantilevered support can cause a higher moment measurement than the same objects being suspended toward a base of the cantilevered support), and because the individual objects are frequently repositioned along the suspension support (e.g., while customers are shopping and/or retrieving the objects), a controller of a suspension-based support may not be able to accurately interpret the sensor data to identify the quantity of objects. In another example, a single measurement of total weight for all the objects on a suspension support may not necessarily provide enough information to confidently indicate the quantity of objects on the suspension support since a controller of the suspension support may not know the identity of the specific objects on the suspension support, whether all such objects are identical or if there is a mix of objects on the suspension support, and/or the weights of the individual objects.

Objects and/or packaging of the objects may have various shapes, sizes, and/or configurations that are designed to have the objects suspended or hung from a support (e.g., a peg, a rail, a rod, other type of bracket). Accordingly, a suspension-based support system is to be configured to enable various types of objects and/or packages of the various shapes and/or sizes to be suspended from the suspension supports and capable of being detectable via one or more sensors. While certain operations associated with certain types of sensors (e.g., image sensors, radar sensors, and/or lidar sensors) can be performed to distinguish between types of objects (e.g., based on identifiers, sizes, shapes, and/or the like), such operations (e.g., image processing, object analysis techniques, object techniques, and/or the like) involve a relatively large quantity of resources and a relatively long time period to process. Furthermore, a business may have a desire to reconfigure and/or rearrange a layout of objects (e.g., products of a retail business or inventory of a logistics business) within a suspension-based support system. Therefore, there is a need for an inventory management system that is adaptable and that provides an accurate representation of statuses of objects suspended from a suspension support without including an overly complex array of sensors or a large quantity of sensors.

According to some implementations described herein, an inventory system is provided that utilizes a suspension support with a sensor configuration that enables accurate detection and/or indication of a status of objects suspended from the suspension support. Such a status may include, for example, an indication of whether objects are suspended from the suspension support, an indication of a quantity of the objects suspended from the suspension support, an indication of a location (e.g., within the inventory system and/or along the suspension support) of an object suspended from the suspension support, an indication of changes to a suspension support (e.g., an addition of an object, a subtraction of an object, or the like), an indication of a capacity of the suspension support, and so on. In some implementations, a suspension support, as described herein, may be an individual module of an inventory system that enables the inventory system to be adjustable, reconfigurable, and/or adaptable to monitor various types of objects, objects of various sizes, and/or objects with various types of packaging or various packing configurations. A controller of the inventory system and/or sensors of the inventory system may be calibrated to account for the variety of objects that may be supported by a certain suspension support. For example, when a suspension support is installed, the controller may determine values and/or characteristics of the sensor data that are to be used to determine a quantity of objects that are suspended from the suspension support (e.g., to account for various sizes and/or weights of the various objects).

In some implementations, as described herein, the suspension support may be configured to receive or be arranged to include a quantity of sensors that may be determined based on a characteristic of the objects (e.g., size, shape, weight, or the like) that are to be suspended from the suspension support, a quantity of the objects, a characteristic of the sensors (e.g., type, dimensions, or the like), and/or a characteristic of the suspension support (e.g., length, strength or rigidity, or the like), among other examples.

In this way, an inventory system is provided that uses suspension supports that are configured to adjustably receive and store a variety of types of objects and accurately monitor and/or indicate the status of the objects using an optimally positioned sensor configuration that utilizes relatively fewer sensors than shelf-based systems and/or typical sensors that are used in shelf-based systems. Accordingly, the inventory management system described herein may conserve resources that would otherwise have been wasted using the sensor arrays of previous systems. More specifically, use of the suspension supports, as described herein, may conserve hardware resources (e.g., by requiring relatively fewer sensors to monitor a suspension support), computing resources (e.g., processor resources, memory resources, and/or the like associated with processing inaccurate, redundant, or unnecessary sensor readings from larger quantities of sensors), network resources (e.g., bandwidth resources, routing resources, and/or the like associated with communicating inaccurate, redundant, or unnecessary sensor readings of the larger quantities of sensors), and/or power resources (e.g., power used by the larger quantities of sensors). Allocation of sensors of the inventory system can be grouped based on being communicatively coupled on a same suspension support and/or assigned to a same suspension support, thereby enabling tracking of various types of objects across multiple suspension supports.

FIG. 1 is a diagram of an example implementation 100 of an inventory system 102 described herein. As shown in FIG. 1, the example implementation 100 includes a plurality of objects 104, multiple suspension supports 106, and a support frame 108 that includes multiple support receivers 110. The plurality of objects 104 may, for example, be merchandise of a business, inventory of a business, equipment for use by a business, and/or the like. The plurality of objects 104 are configured to be suspended from the suspension supports in an organized manner to facilitate tracking of the plurality of objects 104.

Each of the plurality of suspension supports 106, as described herein, is a device or apparatus that is configured to track and suspend the plurality of objects 104. For example, as described herein, a suspension support 106 may provide an inventory status associated with objects that are suspended from the suspension support 106. To track the plurality of objects 104, each of the plurality of suspension supports 106 includes an electrical configuration (e.g., circuitry). The electrical configuration may include a sensor configuration 112 having a plurality of sensor elements 114 and circuitry (e.g., one or more traces, one or more ground planes, one or more communication buses, one or more terminals, one or more components, and/or the like) that connects the sensor elements 114 to an electrical connector interface 116 (e.g., a bus or other communication interface).

A suspension support 106 may be receivable within a support receiver 110 to permit the support frame 108 to support (or be attached to) the suspension support 106, as described herein. When installed within the support receiver 110, the suspension support 106 may extend (or be cantilevered) from the support frame 108. Additionally, or alternatively, a suspension support 106 may be removable from a support receiver 110 to enable the suspension support 106 to be repositioned within the inventory system 102.

The support frame 108 may be configured to support and electronically couple with the plurality of suspension supports 106 to facilitate communication between the sensor elements 114 and a controller 118. Although the controller 118 of example implementation 100 is configured and/or associated with the support frame 108 and/or may be configured to control and/or receive information from multiple suspension supports 106 of the support frame 108, in some examples, the controller 118 and/or multiple controllers 118 may be individually associated with corresponding suspension supports 106. Additionally, or alternatively, the controller 118 may be associated with other support frames to enable communication with other suspension supports of the other support frames. Additionally, or alternatively, the controller 118 may be located at a remote location relative to support frame 108 instead of being physically located on support frame 108 as shown in the example implementation 100.

To facilitate communication with the plurality of suspension supports 106 (e.g., communication between the plurality of suspension supports 106 and the controller 118 and/or communication between the suspension support 106 and the inventory management system 122), the support frame 108 may include a receiver terminal 120 and/or circuitry that is communicatively coupled with the controller 118 and/or the inventory management system 122. For example, the support frame 108 may include a communication interface (e.g., a hardwired Power over Ethernet (POE) port, and/or the like) attached to the receiver terminal 120 that is configured to electrically connect (e.g., contact) a support terminal of the electrical connector interface 116 to the controller 118 to transmit information (e.g., sensor data) from the sensor elements 114 to the controller 118.

The support terminal of the suspension support 106 may be configured to be received within a slot of the receiver terminal 120 and/or placed into contact with one or more leads or traces of the receiver terminal 120 to establish a wired connection to the communication interface and/or the controller 118. Additionally, or alternatively, a connection between the support terminal and the receiver terminal 120 may facilitate a connection to a wireless communication device of the support frame 108 (e.g., a wireless communication device of the controller 118) to enable wireless communication with a network associated with the inventory system (e.g., a Bluetooth radio, long range (LoRa) radio, wireless local area network (WLAN) radio, Zigbee radio, wireless wide area network (WWAN) radio, and/or the like). The communication interface and related components may be integrated into the support frame 108 or may be in the form of a module that electrically and mechanically attaches to the support frame 108 and can be populated in the inventory system as needed. Additionally, or alternatively, the sensor configuration 112 may include a means of wirelessly communicating with the controller 118 and/or with a network associated with the inventory system (e.g., via Bluetooth, long range (LoRa), wireless local area network (WLAN), ZIGBEE®, wireless wide area network (WWAN), and/or the like).

As shown, the inventory system may include an inventory management system 122 that may serve as a backend platform of the inventory system. For example, the inventory management system 122 may be configured to communicate with the controller 118 to receive information from the suspension supports 106 (e.g., from the sensor elements 114 of the suspension supports 106) and/or the controller 118. The inventory management system 122 may store and/or process sensor data and/or configuration information that indicates quantities of the plurality of objects 104 for management of the inventory system that is based on quantities of the plurality of objects 104 (e.g., for stocking purposes, locationing purposes, or the like). The inventory management system 122 may be configured to determine, based on the sensor data and/or configuration information, a quantity of the one or more objects 104 that are being suspended from the suspension supports 106 at a location(s) of the sensor element(s) 114 on the suspension supports. Additionally, or alternatively, the inventory management system 122 may transmit instructions and/or configuration information to the controller 118 and/or the suspension supports 106 (e.g., to calibrate the controller 118 based on sensor configurations 112 of the suspension supports 106 as described herein). In some implementations, the support frame 108 may include a power supply line that is coupled to a power supply unit to provide power to the sensor elements 114 of the suspension supports 106 and/or the controller 118. Power may be supplied, for example, by the building's infrastructure, a solar cell(s) (not shown) at or adjacent to suspension supports 106 or support frame 108, or a coin cell battery (not shown) at or adjacent to suspension supports 106 or support frame 108.

The support frame 108 simplifies the inventory system and enables scalability by allowing for flexible configurations of suspension supports 106. If the suspension supports 106 and the support frame 108 are combined into one physical component, deployment of such a configuration would limit the inventory system's ability to accommodate objects of various sizes and/or a business's ability to reconfigure a layout of the inventory system.

A sensor element 114 may include a force sensitive resistor sensor that is configured to sense an object 104 based on sensing a force applied by the object 104 being suspended from the suspension support 106 at a location (e.g., along a length of the suspension support 106) of the sensor element 114.

In use, a sensor element 114 (e.g., the sensor element 114 located on the suspension support 106 from where the object 104 was previously suspended) may provide sensor data (e.g., measurements sensed by the sensor element 114) that includes a sensor measurement or value that is sensed by the one or more sensor elements 114. For example, once an object 104 is removed from a suspension support 106 (e.g., by a shopper selecting the object 104 to purchase), the sensor element 114 may indicate a sensed force resistance value of the sensor element 114 (e.g., based on sensing the change in the force resistance value). Similarly, once an object 104 is added to the suspension support 106 (e.g., during restocking), the sensor element 114 that detects a decrease in resistance, and thereby an increase in force, may provide the sensor data that indicates the sensed force and/or resistance value(s). Accordingly, an individual sensor element 114 may indicate a set of one or more objects that are positioned or suspended from a location of the individual sensor element 114. For example, the set may be a subset of the total quantity of objects that are suspended from the suspension support 106 if other objects are suspended by the suspension support 106 at locations of another one of the sensor elements 114. In this way, the inventory management system may sum the individual quantities of the sets of objects as indicated by the sensor data from each of the individual sensor elements 114 to determine a total quantity of objects that are suspended from the suspension support 106.

To facilitate tracking an inventory status associated with objects on a suspension support 106, the inventory management system 122 and/or the controller 118 may record a location of each suspension support 106 within the inventory system. The location may be associated with individual support receivers 110, the support frame 108, and/or other support frames 108. For example, the suspension support 106, a support receiver 110, and/or a support frame 108 can each have a unique identifier. Accordingly, when a suspension support 106 is physically and/or electrically coupled with a support receiver 110 and/or the support frame 108, an association can be made using the identifiers. In this way, such a coupling can indicate or identify each location of a suspension support 106 by setting it to match the corresponding location of the support receiver 110 (and/or the corresponding location of the support 108). This coupling may be obtained and/or stored by, for example, scanning a bar code on the suspension support 106 and scanning a bar code associated with the support receiver 110 and/or support frame 108 (e.g., when the suspension support 106 is installed within the support receiver 110). Alternatively, this pairing may be more passive and may be achieved by the suspension support 106 electronically communicating a unique identifier of the suspension support 106 to the controller 118 and/or the inventory management system 122. Furthermore, the locations of the objects 104 that are suspended from the suspension supports 106 may be known and/or based on the individual objects 104 being associated with corresponding suspension supports 106. For example, an association between an object 104 (or object type identified by an identifier of the object, such as a stock keeping unit (SKU) number) and a suspension support 106 may be achieved by, for example, scanning a bar code on the suspension support 106 and a barcode of the object 104 when the object 104 is suspended from the suspension support 106.

As indicated above, FIG. 1 is provided as an example. Other examples may differ from what is described with regard to FIG. 1. The number and arrangement of devices, components or elements shown in FIG. 1 are provided as an example. In practice, there may be additional devices, fewer devices, different devices, differently arranged devices than those shown in FIG. 1. Furthermore, two or more devices shown in FIG. 1 may be implemented within a single device, or a single device shown in FIG. 1 may be implemented as multiple, distributed devices.

Figure 2:
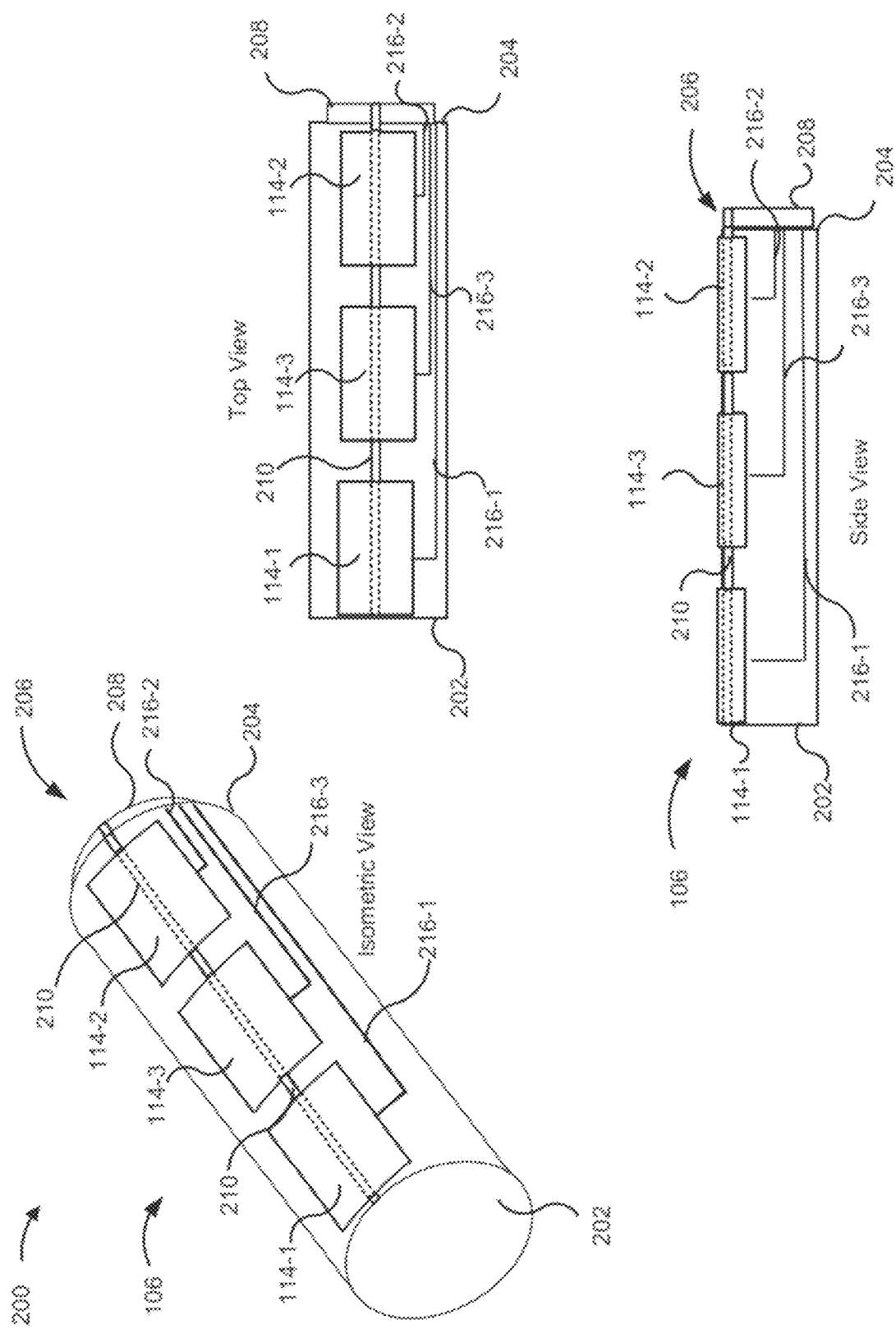
FIG. 2 is a diagram of an example implementation associated with a sensor configuration for a suspension support described herein.

FIG. 2 is a diagram of an example implementation 200 of a sensor configuration for the suspension support 106. For example, as shown in an isometric view, a top view, and a side view of the suspension support in FIG. 2, the suspension support 106 may include a sensor element 114-1, a second sensor element 114-2, and a third sensor element 114-3 (corresponding to the sensor elements 114). As shown, the first sensor element 114-1 is disposed on the suspension support 106 toward a distal end 202 of the suspension support 106, and the second sensor element 114-2 is disposed on the suspension support 106 toward a proximal end 204 of the suspension support 106. The proximal end 204 may correspond to a base of the suspension support 106 that is configured to be received within the support receiver 110 and/or attach to the support frame 108. The third sensor element 114-3 may be an intermediate sensor element that is between the first sensor element 114-1 and the second sensor element 114-2.

As shown in FIG. 2, the individual sensor elements 114 are aligned in a row (e.g., a straight row) along an upper surface 206 of the suspension support 106. For example, the sensor elements 114 may be aligned with one another along the upper surface 206 such that the sensor elements 114 are arranged in a single row that extends from the distal end 202 to the proximal end 204 (or base) of the suspension support 106. In some implementations, the individual sensor elements 114 of the plurality of sensor elements may be evenly distributed along a longitudinal axis of the suspension support 106. For example, the individual sensor elements 114 may be equidistant from one another while arranged in a row between the distal end 202 of the suspension support 106 and the proximal end 204 of the suspension support 106.

As shown in the top view and side view of the suspension support 106, the suspension support 106 may include a support terminal 208 (which may correspond to the support terminal described in connection with FIG. 1). As described herein, the support terminal 208 may enable the sensor elements 114 to be communicatively coupled, via the electrical connector interface 116, with circuitry within the support frame 108.

In example implementation 200, the suspension support 106 may include a common sensor line 210 (e.g., a common trace and/or plate), a first trace 216-1, a second trace 216-2, and a third trace 216-3, that connect the first sensor 114-1, the second sensor 114-2, and the third sensor 114-3, respectively, to the support terminal 208. The common sensor line may be communicatively coupled with the sensors 114 to facilitate a connection with a corresponding terminal of the support terminal. Certain portions of the common sensor line 210 (as indicated by the dotted line) may be below the sensor elements 114 (e.g., a surface of the common line may be coplanar with or below a surface of the support member and/or a bottom surface of the sensor(s)). The common sensor line 210, the traces 216 and/or the support terminal 208 may be configured to form (or be included within) the electrical connector interface 116 of example implementation 100.

In some implementations, the sensor configuration may be formed into a cylindrical form factor and supported by suspension support 106. Additionally, or alternatively, the suspension support 106 may be a pre-existing metal, or otherwise electrically conductive, component of an inventory display system that may have no inventory sensing capability. In such a case, the common sensor line 210 (e.g., a line that corresponds to a common line of the suspension support and/or that is communicatively coupled with corresponding circuitry of the support terminal) may be formed in the sensor configuration 112 and may be provided by the existing metal, or otherwise electrically conductive, suspension support 106, itself. A sensor housing that includes sensor elements 114 and/or circuitry can be assembled over the existing metal, or otherwise electrically conductive, suspension support 106, to create the sensor configuration 112. The sensor housing (e.g., that encloses circuitry of an individual sensor element 114 or all of the sensor elements 114) may take the form of a clamp and/or clip design that is configured to attach (e.g., clamp onto and/or clip together)

to the suspension support. Additionally, or alternatively, the sensor housing may be arranged and/or configured to have a certain design or configuration that corresponds to a shape and/or dimension of the suspension support 106 (e.g., to enable the sensor elements to be securely attached and/or fixed on a certain location of the suspension support 106).

Figure 3B:
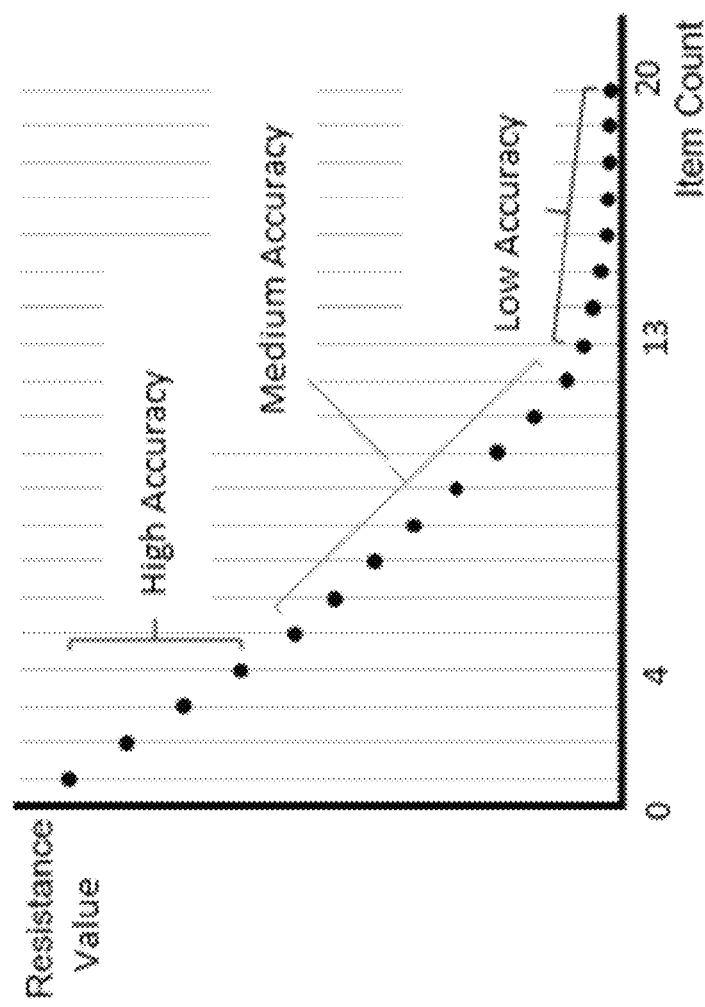
FIG. 3B is a graph illustrating sensor accuracy levels based resistance value and item count.
Figure 3A:
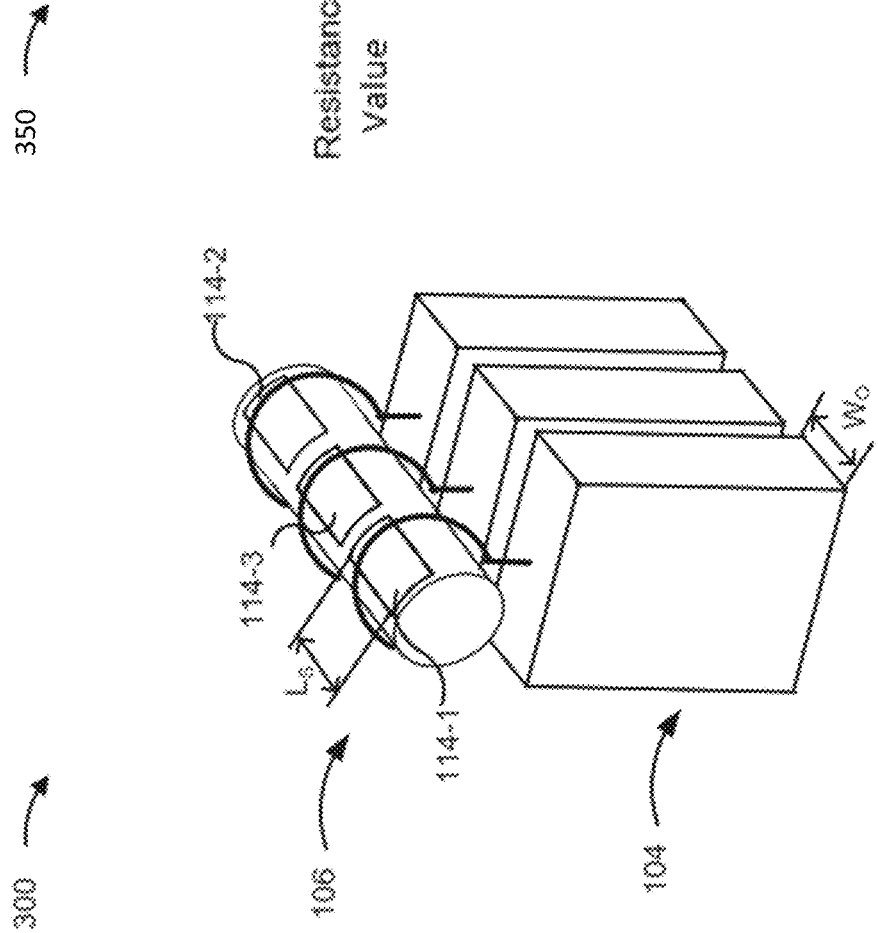
FIG. 3A is a diagram of another example implementation of a sensor configuration described herein.

FIG. 3A is a diagram of another example implementation 300 of a sensor configuration described herein. The sensor configuration may include the sensor element 114-1, the second sensor element 114-2, and the third sensor element 114-3. In example implementation 300, one or more of the sensor elements 114 may be physically configured to sense a single object 104 that is being supported by the suspension support along a length of the sensor element. For example, a length of the sensor ($L_S$) may correspond to a width ($W_O$) of the object 104 that is to be suspended from the suspension support 106. Accordingly, due to such a physical configuration, the maximum capacity (or maximum quantity of objects) that can be suspended from the suspension support 106 may correspond to the quantity of sensor elements 114 included on the suspension support 106. In some implementations, such a sensor configuration can indicate or enable a controller to detect a quantity of objects suspended from the suspension support as a percentage of the sensor elements 114 that are actively detecting an object (which may correspond to a percentage of a maximum quantity of objects that can be suspended from the suspension support 106).

As described herein, a quantity of sensor elements 114 arranged on the suspension support 106 can be determined and/or optimized according to various parameters or conditions of the individual sensor elements 114 and the suspension support. For a sensor that is a certain type of sensor, an ability to accurately determine a quantity of objects may vary as the quantity of the objects suspended from the sensor is increased. For example, a single force sensitive resistor sensor may extend over the length of a suspension support, that may be cantilevered from a support frame, to indicate a quantity of objects suspended from the suspension support. This single force sensitive resistor sensor may generate a single resistance measurement that is mapped to an item count (which is indicative of a total quantity of objects on the suspension support) using a lookup table that may correlate the measured resistance to a total quantity of objects suspended from the suspension support. For example, as shown in FIG. 3B, for a sensor configuration of a suspension support that is configured to include one or more force sensitive resistors, an individual force sensitive resistor sensor may detect a quantity of the objects according to a sensed force by the force sensitive resistor sensor. In such a case, the greater the sensed force, the lower the resistance measurement from the sensor.

As shown, because a relatively lower resistance indicates a higher quantity of objects (e.g., as the resistance decreases, the sensed quantities of objects increases due to the increased force from higher quantities of objects), a single force sensitive resistor sensor on a suspension support may be unable to accurately detect higher quantities of objects. More specifically, if a single force sensitive resistor sensor were configured to detect up to twenty objects on a single suspension support, resistance measurements and/or sensor data can be relatively similar for thirteen to twenty objects that are suspended from the suspension support from the location of the single sensor. On the other hand, the single sensor may more accurately detect quantities of four or fewer because individual resistance measurements corresponding to zero to four objects, respectively, are more distinguishable from one another. Accordingly, in some implementations, a single suspension support (e.g., a suspension support configured to hold twenty objects) may include multiple force sensitive sensors (e.g., that are a same type or size) to more accurately sense the quantity of objects suspended from the single suspension support. More specifically, if the suspension support is configured to hold twenty objects, as discussed in the example above referring to the Graph 350 of FIG. 3B, five or more individual sensors (e.g., twenty objects divided by four or fewer objects that can relatively more accurately be detected (20/4=5)) can be arranged and/or configured on the suspension support, as described herein.

Moreover, use of multiple force sensitive sensors that are configured to accurately sense multiple objects (rather than a single object as shown in FIG. 3A) can reduce a complexity of a suspension support as the quantity of the objects increases because fewer sensors along the suspension support are required to determine a same quantity of objects. Referring to the example associated with FIG. 3B, rather than including a suspension support with twenty force sensitive sensors to detect up to twenty objects, the suspension support may be configured with fewer sensors (e.g., five sensors as discussed in the example), thereby reducing complexity and conserving resources (e.g., because less hardware, computing resources, and/or communication resources are required to process information from five sensors rather than twenty sensors).

Accordingly, while a single force sensitive sensor along the length of a suspension support may provide a relatively simple configuration compared to multiple individual sensors (e.g., requires less hardware, computing resources, and/or communication resources by including only one force sensitive sensor on the support member), the accuracy of determining a quantity of objects may be reduced as the quantity of objects increases (e.g., because as the resistance measurements approach zero resistance, an ability to accurately determine the quantity of objects on the suspension support may be reduced as shown in Graph 350 of FIG. 3B). In this way, an optimal quantity of force sensitive sensors for a suspension support may be determined based on one or more characteristics of the force sensitive sensors (e.g., a type, a dimension, a performance capability, or the like), one or more characteristics of the objects (e.g., a size, shape, weight, or the like), and/or one or more characteristics of the suspension support (e.g., a length of the suspension support, a strength or rigidity of the suspension support, or the like).

Accordingly, a sensor configuration for a suspension support may be configured to more accurately detect a quantity of objects by arranging individual sensors into corresponding segments of the suspension support, to cause the individual sensors to detect up to a configured maximum quantity of objects (e.g., based on dimensions of the sensors and/or objects that are to be suspended from the sensors) at a given time (e.g., a maximum quantity that corresponds to an ability of the sensor to determine the quantity with a threshold degree of accuracy). In such an example, the individual quantities that are sensed by the corresponding sensors can be aggregated (e.g., summed by the control device and/or the inventory management system) to accurately determine a total quantity of objects suspended from the suspension support.

Figure 4:
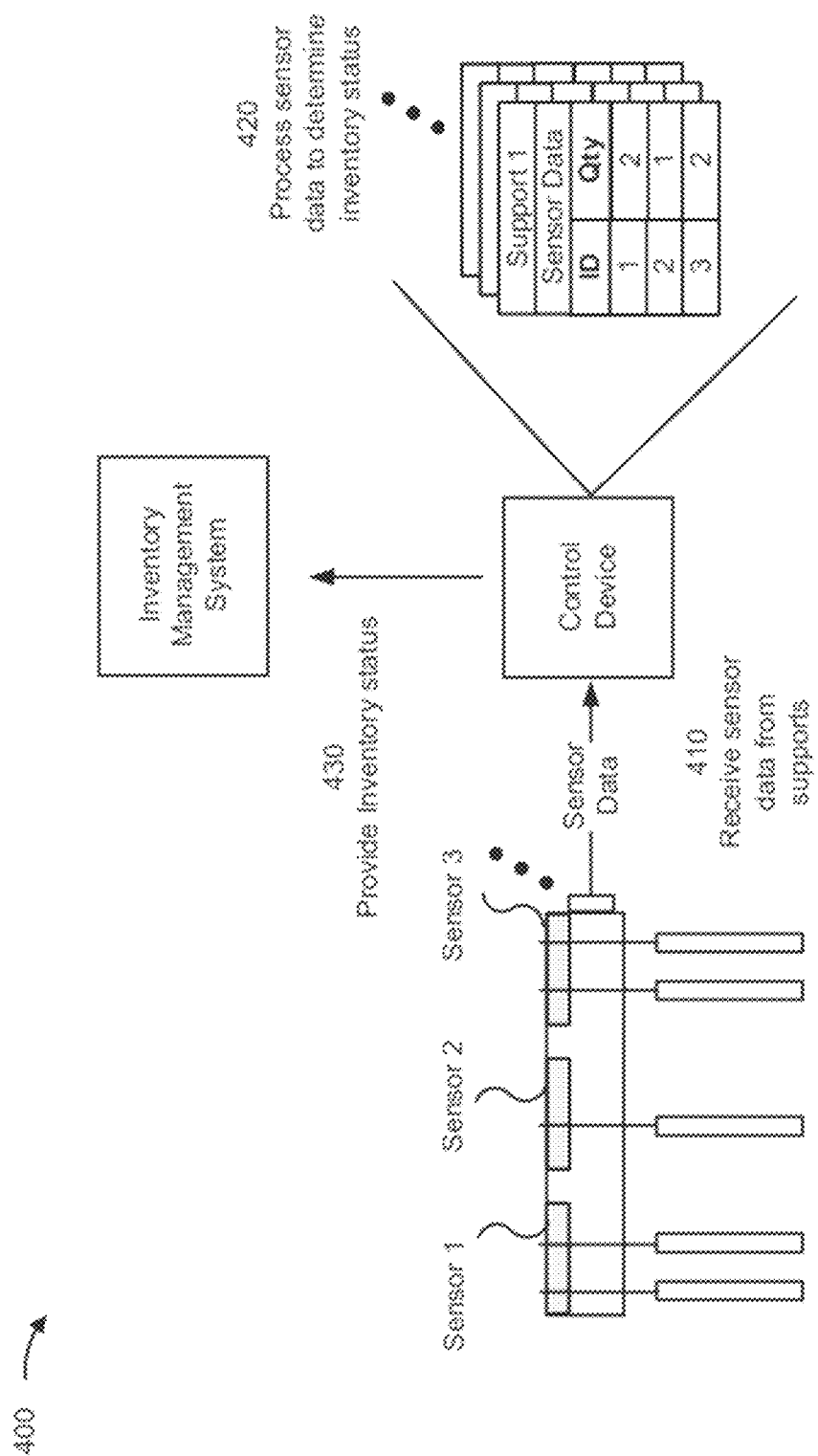
FIG. 4 is a diagram of an example implementation associated with an inventory system described herein.
Figure 5:
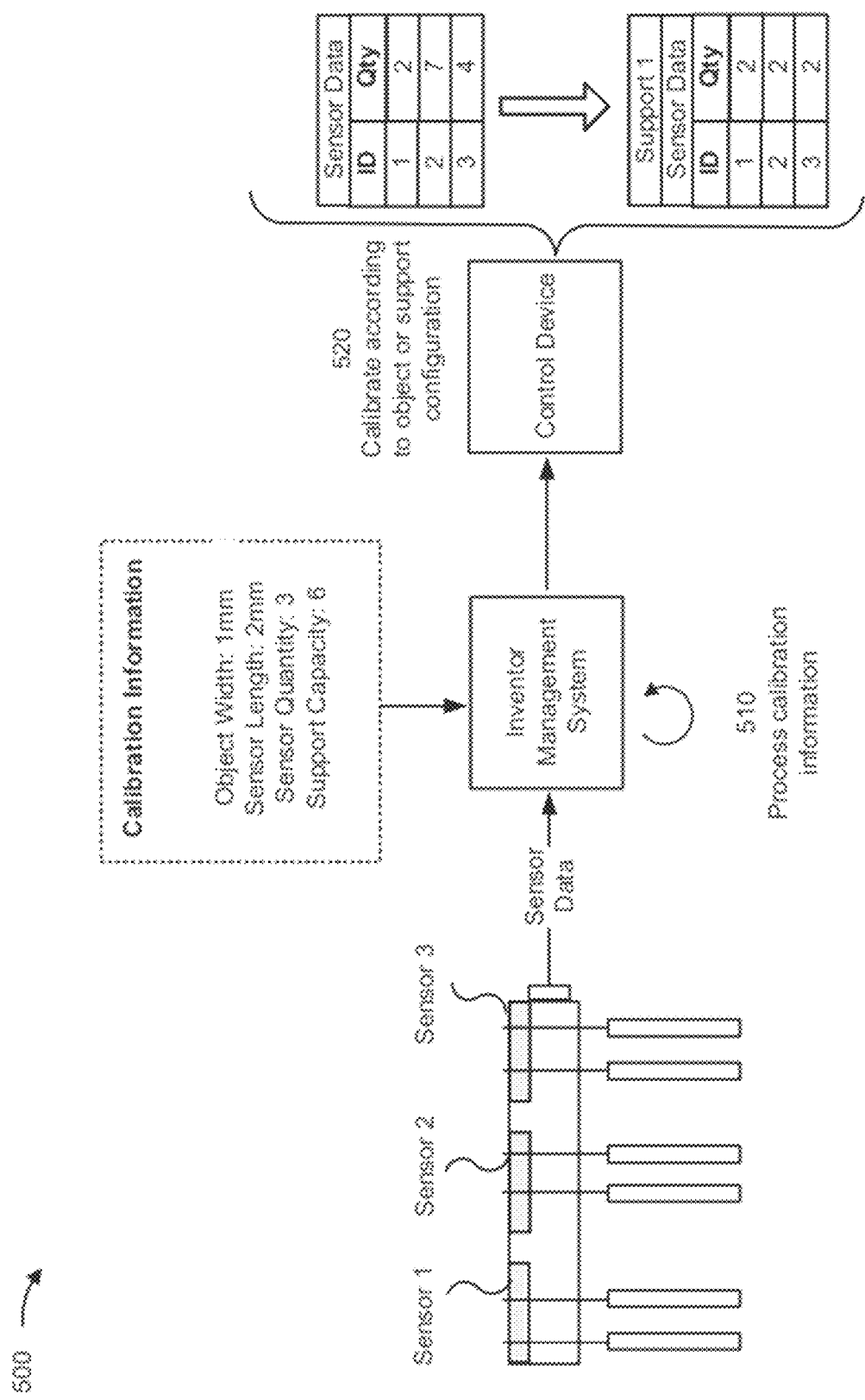
FIG. 5 is a diagram of an example implementation associated with calibration of an inventory system described herein.

FIGS. 4-5 are diagrams of one or more example implementations associated with an inventory system. The examples, as illustrated in FIGS. 4-5, include one or more suspension supports with individual sets of sensor elements (e.g., the suspension support 106 and/or sensor elements 114), a control device (which may include and/or correspond to the controller 118), and an inventory management system (e.g., the inventory management system 122). These devices are described in more detail below in connection with FIG. 6 and FIG. 7.

FIG. 4 is a diagram of an example implementation 400 associated with use of the inventory system. As shown in FIG. 4, and by reference number 410, the control device may receive (and/or collect) sensor data from the suspension supports, as described herein. For example, as shown, the suspension support may include a first sensor (Sensor 1), a second sensor (Sensor 2), and a third sensor (Sensor 3).

As further shown in FIG. 4, and by reference number 420, the control device processes the sensor data to determine an inventory status associated with a suspension support. For example, as shown, the control device may process the data to identify that the first sensor has provided a sensor measurement that is indicative of two objects being suspended by the suspension support at a location of the first sensor. Similarly, the control device may determine from sensor measurements from the second sensor and third sensor that one object is suspended from the suspension support at a location of the second sensor, and two objects are suspended from the suspension support at a location of the third sensor.

As further shown in FIG. 4, and by reference number 430, the control device may provide the inventory status to the inventory management system as described herein.

FIG. 5 is a diagram of an example implementation 500 associated with calibrating the inventory system. For example, the control device (and/or the inventory management system or sensor configuration) may be calibrated to determine a quantity of objects based on a characteristic of the one or more objects. As shown in FIG. 5, and by reference number 510, the inventory management system receives calibration information. The calibration information may include one or more characteristics (e.g., size, shape, dimensions, weight, or the like) of objects that are to be stored on a suspension support.

In some implementations, the inventory management system may derive, from the characteristics of the objects and/or characteristics of the sensor configuration, one or more capabilities of the suspension support. For example, the inventory management system may identify a maximum quantity of objects (e.g., a support capacity) that can be stored (e.g., based on the size of the objects, the length of an individual sensor, and/or a quantity of the sensor elements). Accordingly, the inventory management system may process the calibration information to account for the one or more characteristics and/or calibrate the control device.

As further shown in FIG. 5, and by reference number 520, the inventory management system may calibrate the control device (and/or a controller described herein) according to the calibration information. With reference to an example illustrated in FIG. 5, the inventory management system may determine from an object width, a sensor length, and a sensor quantity that a maximum capacity of the suspension support is six objects. Accordingly, the inventory management system may indicate the maximum capacity to the control device. Accordingly, although the control device may obtain sensor data that indicates a total of 13 objects (two on Sensor 1, seven on Sensor 2, and four on Sensor 3), the control device may determine that the sensor data from Sensor 2 and Sensor 3 is likely inaccurate (e.g., because 13 is greater than the maximum capacity of 6 for the suspension support 106, and, of the three sensors, Sensor 2 and Sensor 3 individually determined a quantity greater than the individual capacity of two for each sensor (7−2=5 and 4−2=2, i.e. sensor data from Sensor 2 and sensor data from Sensor 3 exceed the individual capacity by 5 and 2, respectively)). In some implementations, the control device may determine a likely quantity of objects suspended from Sensor 2 and/or Sensor 3 based on sensor measurements from sensor data associated with other sensors on the suspension support (e.g., sensors that are adjacent and/or near to Sensor 2 and/or Sensor 3).

Furthermore, dividing a suspension support into sections with certain lengths (e.g., which may be based on dimensions of the suspension support, the sensors, objects that are to be suspended from the suspension support, or other factors) also enables the functionality to dynamically set a counting threshold in each sensor. For example, for a sensor arrangement similar to the one shown in FIG. 5 (i.e. split into three sensor sections), if two of the three sensors report a measurement that indicates an object is present, then those measurements can be used to set a counting threshold for a third sensor, and thereby section of the suspension support, that may be empty. In such a case, the inventory management system may reduce noise (and/or achieve adaptive noise immunity), resulting in more accurate counts.

In this way, the inventory management system and/or control device may be calibrated to interpret sensor data from sensor elements of one or more suspension supports described herein.

As previously described, with the proper selection of sensor density for a given object to be stored on a suspension support, the quantity of objects that fit on each sensor segment may be a small whole number. In some implementations, this arrangement may be further leveraged to detect misplaced objects on a suspension support by identifying resistances out of range for the object counts expected. Misplaced objects are objects not intended or planned to be suspended from a particular suspension support. For example, a suspension support may be divided into 5 sections with up to 4 objects expected to fit on each section. Resistance measurements for sections 1 through 5 may match closely with what would be expected for quantities of 0, 0, 3, 4, and 5, respectively. Since a quantity of 5 is not in the set of valid counts, the system may determine that section 5 has an incorrect object(s), such as a heavier object(s), hanging on it, and an alert can be triggered to visually inspect this suspension support.

As indicated above, FIG. 4-5 are provided as examples. Other examples may differ from what is described with regard to FIGS. 4 and/or 5. The number and arrangement of devices shown in FIGS. 4 and/or 5 are provided as an example. In practice, there may be additional devices, fewer devices, different devices, or differently arranged devices than those shown in FIGS. 4 and/or 5. Furthermore, two or more devices shown in FIGS. 4 and/or 5 may be implemented within a single device, or a single device shown in FIGS. 4 and/or 5 may be implemented as multiple, distributed devices. Additionally, or alternatively, a set of devices (e.g., one or more devices) shown in FIGS. 4 and/or 5 may perform one or more functions described as being performed by another set of devices shown in FIGS. 4 and/or 5.

Figure 6:
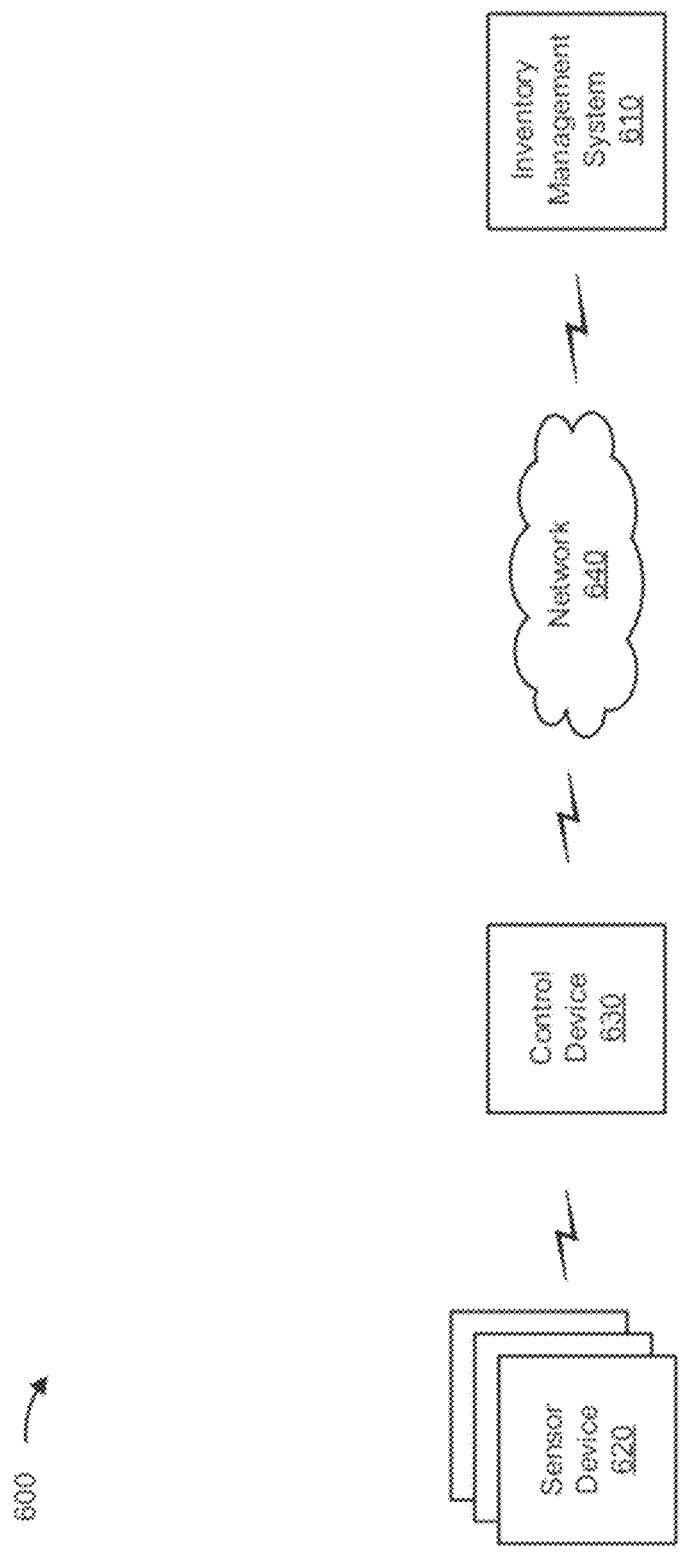
FIG. 6 is a diagram of an example environment in which systems and/or methods described herein may be implemented.

FIG. 6 is a diagram of an example environment 600 in which systems and/or methods described herein may be implemented. As shown in FIG. 6, environment 600 may include an inventory management system 610, a sensor device 620, a control device 630, and a network. 640. Devices of environment 600 may interconnect via wired connections, wireless connections, or a combination of wired and wireless connections.

The inventory management system 610 includes one or more devices capable of receiving, generating, storing, processing, providing, and/or routing information associated with managing inventory of an inventory system, as described elsewhere herein. The inventory management system 610 may include a communication device and/or a computing device. For example, the inventory management system 610 may include a server, such as an application server, a client server, a web server, a database server, a host server, a proxy server, a virtual server (e.g., executing on computing hardware), or a server in a cloud computing system. In some implementations, the inventory management system 610 includes computing hardware used in a cloud computing environment.

The sensor device 620 includes one or more devices capable of receiving, generating, storing, processing, and/or providing information associated with indicating a quantity of objects on a suspension support, as described elsewhere herein. The sensor device 620 may include a communication interface and/or one or more sensor elements described herein.

The control device 630 includes one or more devices capable of receiving, generating, storing, processing, and/or providing information associated with processing sensor data for managing inventory, as described elsewhere herein. The control device 630 may include a communication device and/or a computing device. The control device 630 may include a controller of an inventory system, a support frame, and/or a suspension support described herein. In some implementations, the control device 630 may include or be associated with an operator station or management station of the inventory system.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of environment 600 may perform one or more functions described as being performed by another set of devices of environment 600.

Figure 7:
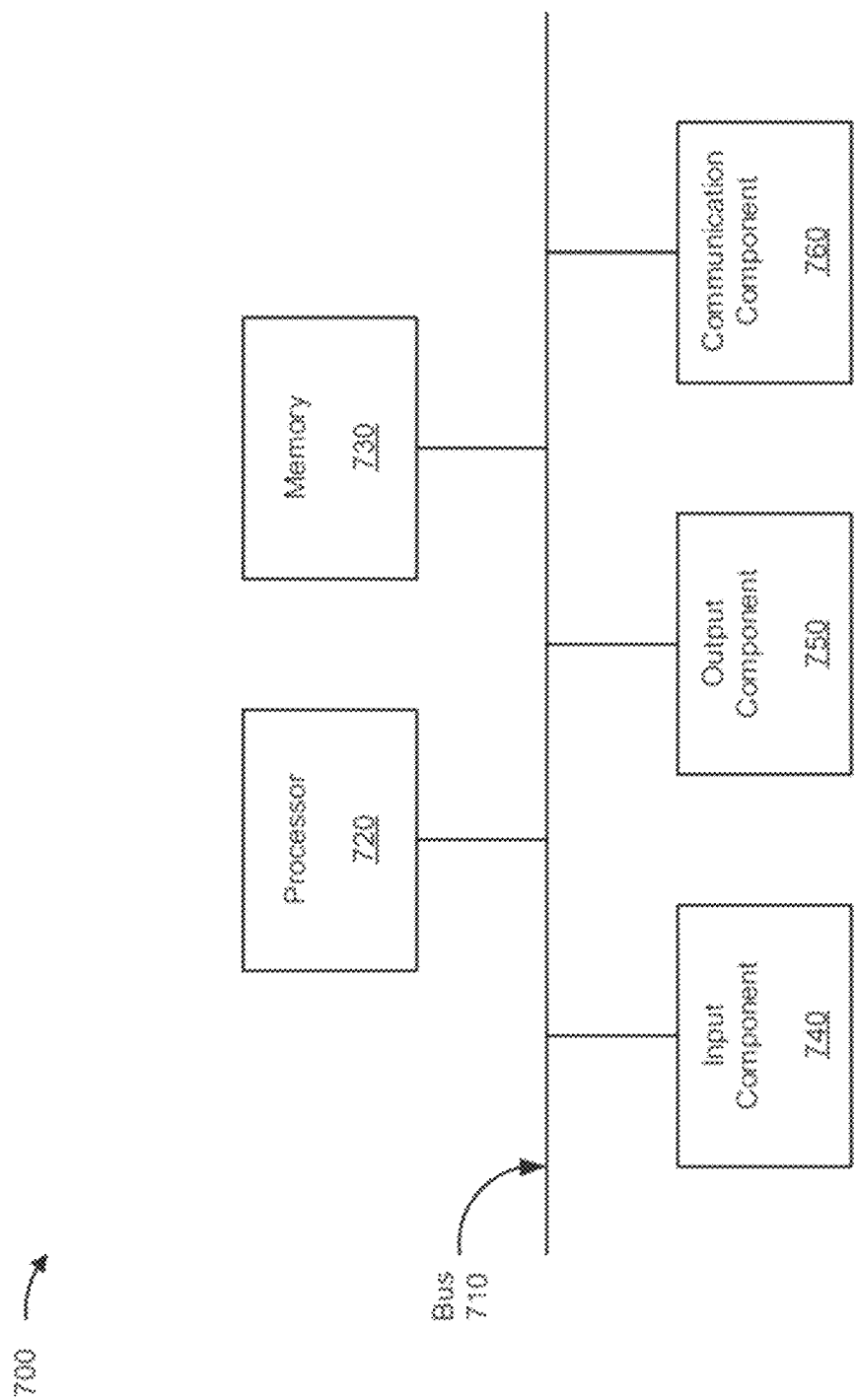
FIG. 7 is a diagram of example components of one or more devices of FIG. 6.

FIG. 7 is a diagram of example components of a device 700, which may correspond to the inventory management system 610, the sensor device 620, and/or the control device 630. In some implementations, the inventory management system 610, the sensor device 620, and/or the control device 630 include one or more devices 700 and/or one or more components of device 700. As shown in FIG. 7, device 700 may include a bus 710, a processor 720, a memory 730, an input component 740, an output component 750, and a communication component 760.

Bus 710 includes one or more components that enable wired and/or wireless communication among the components of device 700. Bus 710 may couple together two or more components of FIG. 7, such as via operative coupling, communicative coupling, electronic coupling, and/or electric coupling. Processor 720 includes a central processing unit, a graphics processing unit, a microprocessor, a controller, a microcontroller, a digital signal processor, a field-programmable gate array, an application-specific integrated circuit, and/or another type of processing component. Processor 720 is implemented in hardware, firmware, or a combination of hardware and software. In some implementations, processor 720 includes one or more processors capable of being programmed to perform one or more operations or processes described elsewhere herein.

Memory 730 includes volatile and/or nonvolatile memory. For example, memory 730 may include random access memory (RAM), read only memory (ROM), a hard disk drive, and/or another type of memory (e.g., a flash memory, a magnetic memory, and/or an optical memory). Memory 730 may include internal memory (e.g., RAM, ROM, or a hard disk drive) and/or removable memory (e.g., removable via a universal serial bus connection). Memory 730 may be a non-transitory computer-readable medium. Memory 730 stores information, instructions, and/or software (e.g., one or more software applications) related to the operation of device 700. In some implementations, memory 730 includes one or more memories that are coupled to one or more processors (e.g., processor 720), such as via bus 710.

Input component 740 enables device 700 to receive input, such as user input and/or sensed input. For example, input component 740 may include a touch screen, a keyboard, a keypad, a mouse, a button, a microphone, a switch, a sensor, a global positioning system sensor, an accelerometer, a gyroscope, and/or an actuator. Output component 750 enables device 700 to provide output, such as via a display, a speaker, and/or a light-emitting diode. Communication component 760 enables device 700 to communicate with other devices via a wired connection and/or a wireless connection. For example, communication component 760 may include a receiver, a transmitter, a transceiver, a modem, a network interface card, and/or an antenna.

Device 700 may perform one or more operations or processes described herein. For example, a non-transitory computer-readable medium (e.g., memory 730) may store a set of instructions (e.g., one or more instructions or code) for execution by processor 720. Processor 720 may execute the set of instructions to perform one or more operations or processes described herein. In some implementations, execution of the set of instructions, by one or more processors 720, causes the one or more processors 720 and/or the device 700 to perform one or more operations or processes described herein. In some implementations, hardwired circuitry is used instead of or in combination with the instructions to perform one or more operations or processes described herein. Additionally, or alternatively, processor 720 may be configured to perform one or more operations or processes described herein. Thus, implementations described herein are not limited to any specific combination of hardware circuitry and software.

The number and arrangement of components shown in FIG. 7 are provided as an example. Device 700 may include additional components, fewer components, different components, or differently arranged components than those shown in FIG. 7. Additionally, or alternatively, a set of components (e.g., one or more components) of device 700 may perform. one or more functions described as being performed by another set of components of device 700.

Figure 8:
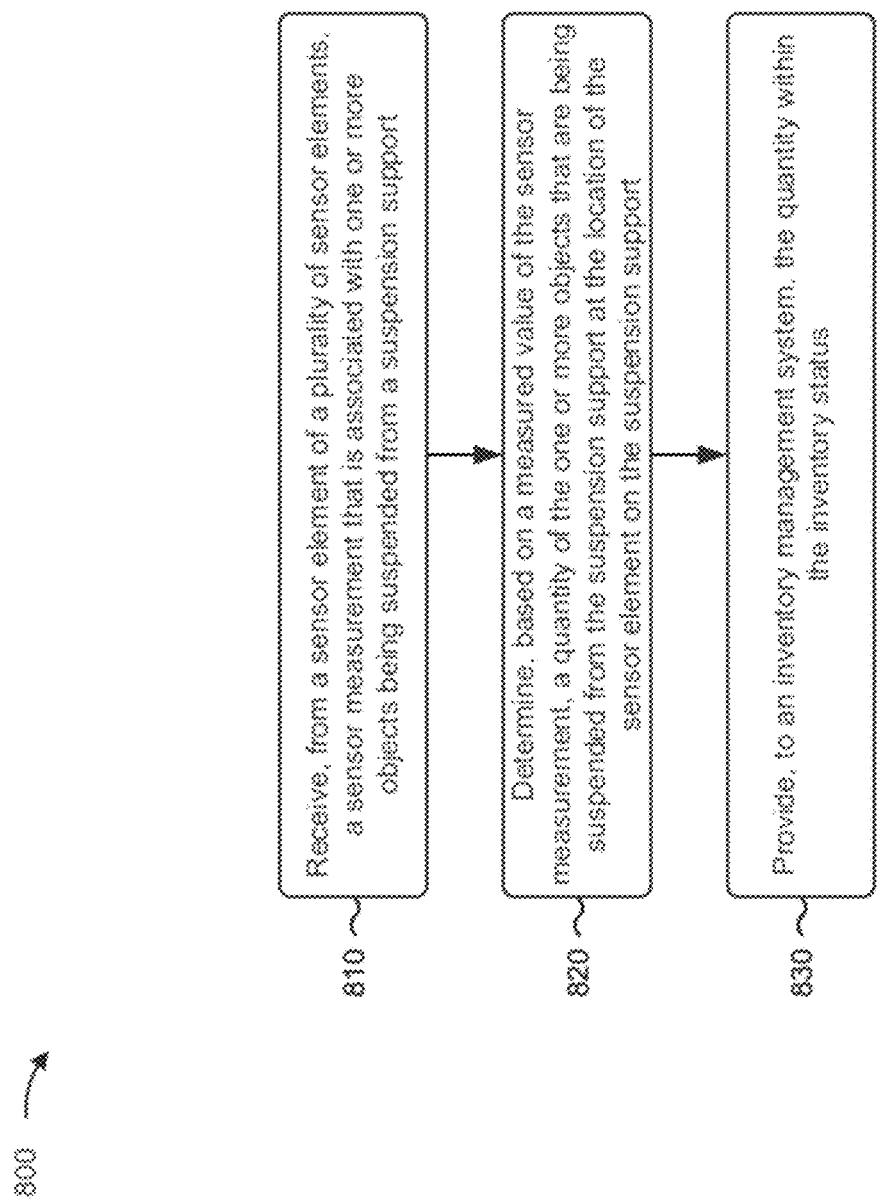
FIG. 8 is a flowchart of an example process associated with an inventory support for items monitored by an inventory management system.

FIG. 8 is a flowchart of an example process 800 associated with an inventory support for items monitored by an inventory management system. In some implementations, one or more process blocks of FIG. 8 may be performed by an inventory management system (e.g., inventory management system 610). In some implementations, one or more process blocks of FIG. 8 may be performed by another device or a group of devices separate from or including the inventory management system, such as the controller 118 and/or the control device 630. Additionally, or alternatively, one or more process blocks of FIG. 8 may be performed by one or more components of device 700, such as processor 720, memory 730, input component 740, output component 750, and/or communication component 760.

As shown in FIG. 8, process 800 may include receiving, from a sensor element of the plurality of sensor elements, a sensor measurement that is associated with one or more objects being suspended from the suspension support (block 810). For example, the inventory management system may receive, from a sensor element of the plurality of sensor elements, a sensor measurement that is associated with one or more objects being suspended from the suspension support, as described above. In some implementations, individual sensor elements of the plurality of sensor elements are force sensitive resistor sensors that are aligned in a row along an upper surface of the suspension support.

As further shown in FIG. 8, process 800 may include determining, based on a measured value of the sensor measurement, a quantity of the one or more objects that are being suspended from the suspension support at a location of the sensor element on the suspension support (block 820). For example, the inventory management system may determine, based on a measured value of the sensor measurement, a quantity of the one or more objects that are being suspended from the suspension support at a location of the sensor element on the suspension support, as described above.

In some implementations, the inventory management system is calibrated to determine the quantity based on a characteristic or characteristics of the one or more objects. In some implementations, the inventory management system determines the quantity based on another sensor measurement from another sensor element of the plurality of sensor elements. The inventory management system may identify a quantity value associated with the measured value in a mapping of individual sensor measurements to corresponding quantities of objects, and determining the quantity based on the quantity value being associated with the measured value within the mapping.

As further shown in FIG. 8, process 800 may include providing, to an inventory management system, the quantity within an inventory status associated with the one or more objects (block 830). For example, the inventory management system may provide, to an inventory management system, the quantity within an inventory status associated with the one or more objects, as described above.

In some implementations, the quantity is provided to the inventory management system via an electrical connector interface of the suspension support that communicatively couples the plurality of sensor elements with the controller.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, or the like) on which machine-readable instructions (e.g., code in the form of, for example, software and/or firmware) can be stored. The instructions may be stored for any suitable duration of time, such as permanently, for an extended period of time (e.g., while a program associated with the instructions is executing), or for a short period of time (e.g., while the instructions are cached, during a buffering process, or the like). Further, as used herein, each of the terms "tangible machine-readable medium," "non-transitory machine-readable medium" and "machine-readable storage device" is expressly defined to exclude propagating signals. That is, as used in any claim herein, a "tangible machine-readable medium," a "non-transitory machine-readable medium," and a "machine-readable storage device," or the like, should not be interpreted as being implemented as a propagating signal.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A structure, comprising:
   a frame having a receiver, the receiver including a receiver terminal;

a straight support receivable within the receiver and configured to extend perpendicularly from the frame;

a sensor configuration arranged on the straight support, the sensor configuration having a plurality of sensor elements positioned on an upper surface of the straight support, the plurality of sensor elements configured to sense whether one or more objects are suspended from a position of a respective sensor element on the upper surface of the straight support; and an electrical connector interface arranged on the straight support and communicatively coupled with a controller via the receiver terminal, the electrical connector interface being configured to facilitate communication of an inventory status associated with the straight support, wherein a sensor element of the plurality of sensor elements positioned on the upper surface of the straight support includes a force sensitive resistor sensor configured to sense an object of the one or more objects based on sensing a force applied by the object suspended from a position in direct contact with the sensor element on the upper surface of the straight support.

2. The structure of claim 1, wherein respective sensor elements of the plurality of sensor elements are aligned along the upper surface of the straight support.

3. The structure of claim 1, wherein a sensor element of the plurality of sensor elements is physically configured to sense a single object of the one or more objects suspended from along a length of the sensor element positioned on the upper surface of the support.

4. The structure of claim 1, wherein a sensor element of the plurality of sensor elements is physically configured to enable the sensor element to sense multiple objects suspended from along a length of the sensor element positioned on the upper surface of the support.

5. The structure of claim 1, wherein respective sensor elements of the plurality of sensor elements are evenly distributed, along a longitudinal axis of the straight support, between a distal end of the straight support and a proximal end of the straight support that is attached to the frame.

6. The structure of claim 1, wherein the controller is configured to:

receive, from a sensor element of the plurality of sensor elements, a sensor measurement associated with sensing whether the one or more objects are suspended from the straight support;

determine, based on a value of the sensor measurement, a quantity of a set of the one or more objects suspended from the straight support at a position of the sensor element; and provide, to an inventory management system and via the electrical connector interface, the quantity within the inventory status.

7. A straight support, comprising:

a sensor configuration arranged on an upper surface of the straight support, the sensor configuration having a plurality of sensor elements positioned on the upper surface of the straight support, the plurality of sensor elements configured to sense whether one or more objects are suspended from a position in direct contact with a respective sensor element on the upper surface of the straight support; and an electrical connector interface arranged on the straight support and communicatively coupled with a controller via circuitry within a frame, the electrical connector interface being configured to facilitate communication of sensor data associated with the plurality of sensor elements to indicate an inventory status associated with the straight support, wherein the straight support is configured to extend perpendicularly from the frame, and the frame is configured to receive the straight support via a receiver including the circuitry.

8. The straight support of claim 7, wherein respective sensor elements of the plurality of sensor elements are positioned in a row along the upper surface of the straight support that extends from a distal end of the straight support to a base of the straight support.

9. The straight support of claim 7, wherein the electrical connector interface includes a support terminal at a base of the straight support, and the support terminal enables the plurality of sensor elements to be communicatively coupled, via the electrical connector interface, with the circuitry within the frame.

10. The straight support of claim 7, wherein the sensor configuration comprises:

a first sensor element, of the plurality of sensor elements, that is disposed on the straight support toward a distal end of the straight support;

a second sensor element, of the plurality of sensor elements, that is disposed on the straight support toward a proximal end of the straight support; and one or more intermediate sensor elements, of the plurality of sensor elements, that are between the first sensor element and the second sensor element, wherein the first sensor element, the second sensor element, and the one or more intermediate sensor elements are aligned in a single row along the upper surface of the straight support.

11. The straight support of claim 7, wherein a dimension of respective sensor elements of the plurality of sensor elements is based on a corresponding dimension of a single object of the one or more objects suspended from the straight support.

12. The straight support of claim 7, wherein a sensor element of the plurality of sensor elements is physically configured to sense multiple objects suspended from the straight support along a length of the sensor element positioned on the upper surface of the straight support.

13. The straight support of claim 7, wherein respective sensor elements of the plurality of sensor elements are positioned along a longitudinal axis of the straight support, between a distal end of the straight support and a proximal end of the straight support that is configured to be attached to the frame.

14. A system, comprising:

a straight support receivable within a receiver of a frame, the receiver having a receiver terminal and the straight support being configured to extend perpendicularly from the frame;

a sensor configuration arranged on the straight support, the sensor configuration having a plurality of sensor elements positioned on an upper surface of the straight support, the plurality of sensor elements configured to sense whether an object is suspended from a position in direct contact with a respective sensor element on the upper surface of the straight support; and a controller configured to:

receive, from a sensor element of the plurality of sensor elements, a sensor measurement that is associated with one or more objects suspended from the straight support;

determine, based on a measured value of the sensor measurement, a quantity of the one or more objects suspended from the straight support at the position of the sensor element on the upper surface of the straight support; and provide, to an inventory management system, the quantity within an inventory status associated with the one or more objects, wherein the quantity is provided to the inventory management system by an electrical connector interface arranged on the straight support that communicatively couples the plurality of sensor elements with the controller via the receiver terminal.

15. The system of claim 14, wherein the controller, to determine the quantity, is configured to:

identify a quantity value associated with the measured value in a mapping of individual sensor measurements to corresponding quantities of objects; and determine the quantity based on the quantity value being associated with the measured value within the mapping.

16. The system of claim 14, wherein the controller is calibrated to determine the quantity based on a characteristic of the one or more objects.

17. The system of claim 14, wherein the controller, to determine the quantity of the one or more objects, is configured to:

determine the quantity based on another sensor measurement from another sensor element of the plurality of sensor elements.

18. The system of claim 14, wherein respective sensor elements of the plurality of sensor elements are force sensitive resistor sensors that are aligned in a row along an upper surface of the suspension support.

* * * * *